United States Patent
Briscoe et al.

(10) Patent No.: US 7,085,832 B2
(45) Date of Patent: Aug. 1, 2006

(54) METHOD AND APPARATUS FOR ENABLING AN INTERNET WEB SERVER TO KEEP AN ACCURATE COUNT OF PAGE HITS

(75) Inventors: Paul Roger Briscoe, Marietta, GA (US); Stephen Carl Hammer, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 10/135,278

(22) Filed: Apr. 30, 2002

(65) Prior Publication Data

US 2003/0204561 A1    Oct. 30, 2003

(51) Int. Cl.
G06F 15/16    (2006.01)

(52) U.S. Cl. .................................. 709/224; 709/219

(58) Field of Classification Search ................ 709/203, 709/217–219, 224
See application file for complete search history.

(56) References Cited

U.S. PATENT DOCUMENTS

| | | | |
|---|---|---|---|
| 5,852,717 A | 12/1998 | Bhide et al. | 395/200.33 |
| 5,892,917 A | 4/1999 | Myerson | 395/200.54 |
| 5,907,681 A * | 5/1999 | Bates et al. | 709/228 |
| 5,918,013 A | 6/1999 | Mighdoll et al. | 395/200.47 |
| 5,935,207 A | 8/1999 | Logue et al. | 709/219 |
| 5,941,957 A | 8/1999 | Ingrassia, Jr. et al. | 709/248 |
| 5,951,643 A | 9/1999 | Shelton et al. | 709/227 |
| 5,951,652 A | 9/1999 | Ingrassia, Jr. et al. | 709/248 |
| 5,954,798 A | 9/1999 | Shelton et al. | 709/224 |
| 6,032,182 A * | 2/2000 | Mullen-Schultz | 709/223 |
| 6,035,332 A | 3/2000 | Ingrassia, Jr. et al. | 709/224 |
| 6,061,715 A | 5/2000 | Hawes | 709/203 |
| 6,094,662 A | 7/2000 | Hawes | 707/104 |
| 6,112,240 A * | 8/2000 | Pogue et al. | 709/224 |
| 6,112,246 A * | 8/2000 | Horbal et al. | 709/230 |
| 6,236,661 B1 | 5/2001 | Ballard | 370/410 |
| 6,256,712 B1 | 7/2001 | Challenger et al. | 711/141 |
| 6,263,364 B1 | 7/2001 | Najork et al. | 709/217 |
| 6,275,858 B1 | 8/2001 | Bates et al. | 709/228 |
| 6,278,449 B1 | 8/2001 | Sugiarto et al. | 345/334 |
| 6,327,584 B1 | 12/2001 | Xian et al. | 707/1 |
| 6,330,606 B1 | 12/2001 | Logue et al. | 709/226 |
| 6,912,563 B1 * | 6/2005 | Parker et al. | 709/204 |
| 2001/0056460 A1 | 12/2001 | Sahota et al. | 709/201 |

* cited by examiner

Primary Examiner—Dung Dinh
(74) Attorney, Agent, or Firm—Schmeiser, Olsen & Watts; David R. Irvin

(57) ABSTRACT

A method for enabling a server to maintain an accurate count of web-page views. The server maintains a counter that records the number of times the page is accessed due to automatic browser refreshes, and a counter that records the number of times the page is accessed otherwise. A browser accesses the URL of the web page and records a timestamp. When the browser next accesses the page, it determines the present time, and subtracts the timestamp from the present time. The browser then compares the difference with bounds that reflect a window of tolerance about an expected content-update period of the web page. If the difference is within the bounds, the browser instructs the server to advance the automatic-refresh counter; otherwise, the server advances the page-hit counter.

20 Claims, 4 Drawing Sheets

METHOD AND APPARATUS FOR ENABLING AN INTERNET WEB SERVER TO KEEP AN ACCURATE COUNT OF PAGE HITS

FIELD OF THE INVENTION

The present invention applies to the Internet and the field of World Wide Web content servers, and more particularly to a method and apparatus for improving the accuracy with which a server counts the number of times that clients access a web page.

BACKGROUND

A significant share of the cost of operating the World Wide Web is underwritten by advertising. For example, the cost of providing informational web pages may be supported by displaying advertisements to each Internet user who accesses the web page. For this method to have integrity, the web-page provider must be able to give the advertiser an accurate account of how often the web page is visited, and presumably how many times the advertisement is viewed.

Providing an accurate count becomes difficult when the server periodically updates the content of the web page, for example when an HTML web page gives scores for sports events in progress. In this case, web browsers may automatically refresh to keep up with changes in the scores by re-accessing the web page periodically, commensurate with the content-update period of the web page. Each time a browser refreshes by re-accessing the web page, the server advances its count of how many times the page is viewed. Often, however, no human is present to see the advertisements when the browser automatically refreshes the updated web page. This means that a distortion is introduced by coupling the count of how many times the web page and its advertisements are viewed to the count of how many times the page is accessed.

Thus, in order to provide greater accuracy in counting how many times a web page is viewed, there is a need for a method and apparatus for determining whether an access to a web page is made explicitly under the control of a human user or is the result of an automatic web browser refresh.

SUMMARY OF THE INVENTION

The present invention provides method and apparatus enabling a server to maintain an accurate count of the number of times a web page is viewed, by factoring-out accesses to the web page that result from automatic browser refreshes.

Clients having web browsers connect to a server that provides a web page over the Internet. According to the invention, the server maintains two counters in association with the web page: an automatic-refresh counter that records the number of page accesses generated by browsers due to automatic refreshes, and a page-hit counter that records the number of page accesses not due to automatic refresh operations by the browsers, which are presumed to be page accesses initiated explicitly by a human user.

When a client first accesses the URL associated with the web page in question, the client determines the present time according to the client's internal clock, and records this time as a timestamp. The client then reads information from the web page regarding the rate at which the server updates the content of the web page, in particular the page's content-update period. Using this information, the client configures its web browser to refresh automatically according to the content-update period of the web page.

The client then monitors for the occurrence of two conditions: (a) manual access of the web page initiated by a user who clicks on a refresh button (or, equivalently, accesses a book mark, or a link from another page, or an entry in the web browser's history, and so forth), and (b) the expiration of a clock that indicates time for automatic refresh. When either (a) or (b) occurs, the client sends a new request to the server to access the web page. In preparing for the request, the client reads the previously recorded timestamp, and determines the present time. The client then subtracts the timestamp from the present time, to provide a difference, and compares the difference with preestablished bounds that reflect a window of tolerance about the content-update period of the web page. If the difference falls within the bounds, the client instructs the server to advance the automatic-refresh counter; if the difference falls outside the bounds, the client instructs the server to advance the page-hit counter. The client then overwrites the timestamp with the present time, for reference when (a) or (b) occurs again.

These and other aspects and advantages of the invention will be more fully appreciated when considered in light of the following drawings and detailed description.

DETAILED DESCRIPTION

The present invention provides a more accurate way of counting how many time Internet users access and view a web page by keeping, and factoring-out, a count of accesses to the web page caused by automatic web browser refreshing.

Figure 1:
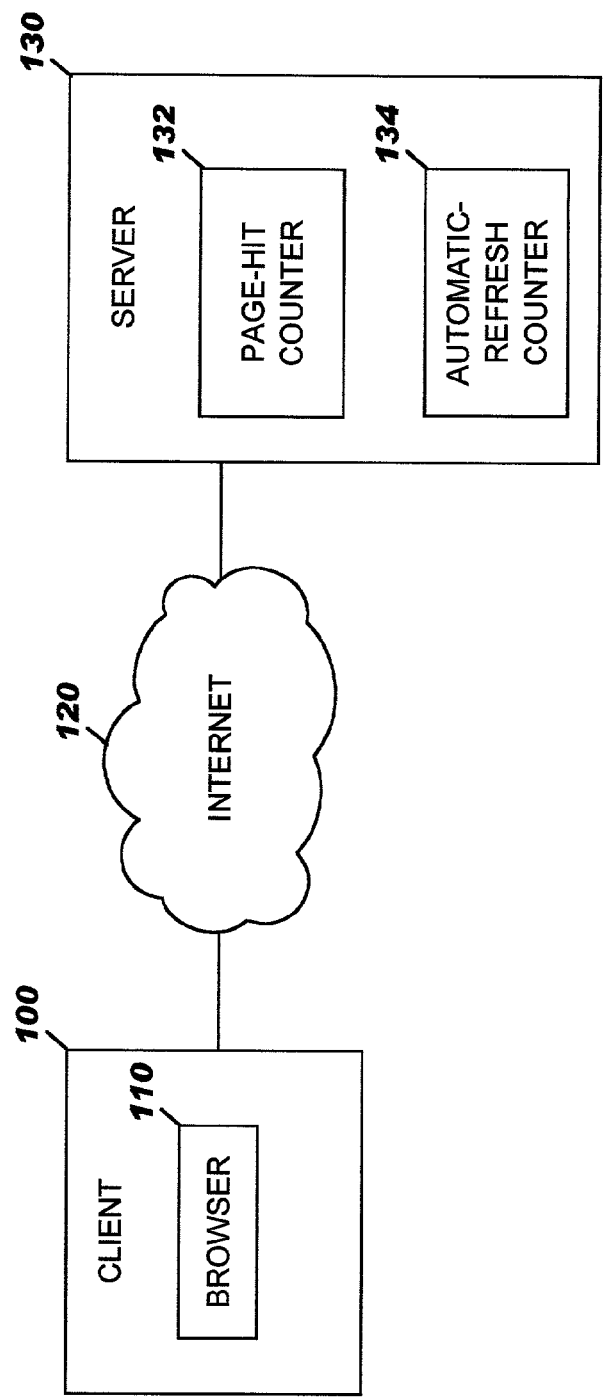
FIG. 1 shows a web server according to the invention, connected via the Internet to a client that has a web browser.

FIG. 1 shows a client 100 connected, via the Internet 120, to a server 130. The client 100 may be a personal computer, and may include a web browser 110 for accessing a web page provided by the server 130. Although FIG. 1 shows connection via the Internet 120, connection may also be provided in other ways, for example by an Intranet or by any other communication network.

The server 130 according to an embodiment of the present invention includes a page-hit counter 132 and an automatic-refresh counter 134, where both are associated with a web page provided by the server 130. The purpose of the counters is to enable the server 130 to keep an accurate tally of how many times clients view the web page.

The server 130 keeps a count of page hits by advancing the page-hit counter 132. Here, a "page hit" is an access of the web page made under the deliberate control of a user. Examples of page hits include instances when a user clicks a browser reload (refresh) button, or goes to a bookmarked page, or clicks a back button, or navigates to an entry in a browser history, or follows a link to the subject web page from another web page, or types a URL into the browser's navigation line, and so forth. The commonality is that a human user explicitly initiates the action leading to the web page access.

Not all web-page accesses are page hits. Here, web page accesses caused by automatic refresh activities of browsers such as web browser 110 are called "automatic refreshes," and are counted separately from page hits. When the client 100 first accesses a web page, the client 100 may read information from the web page regarding the rate at which the server 130 updates the content of the web page, in particular the page's content-update period. For example, the server 130 may update the content of the web page every 120 seconds, in which case the content-update period would be 120 seconds. Using this information, the client 100 configures the web browser 110 to refresh automatically according to the content-update period. When the web page is subsequently accessed as a result of an automatic refresh, the server advances the automatic-refresh counter 134 rather than the page-hit counter 132.

The present invention also encompasses all other equivalent ways of keeping such counts. For example, in another embodiment of the invention, a first counter may be kept that records the total number of times the web page is accessed for any reason, and a second counter may be kept that records the number of automatic refreshes. In this case, the number of page hits may be computed by subtracting the number of automatic refreshes from the total number of times the web page is accessed. In yet another exemplary embodiment of the invention, the second counter may record the number of page hits, in which case the number of automatic refreshes may be computed by subtracting the number of page hits from the total number of times the web page is accessed. These and other similar embodiments fall within the scope of the present invention.

Figure 2:
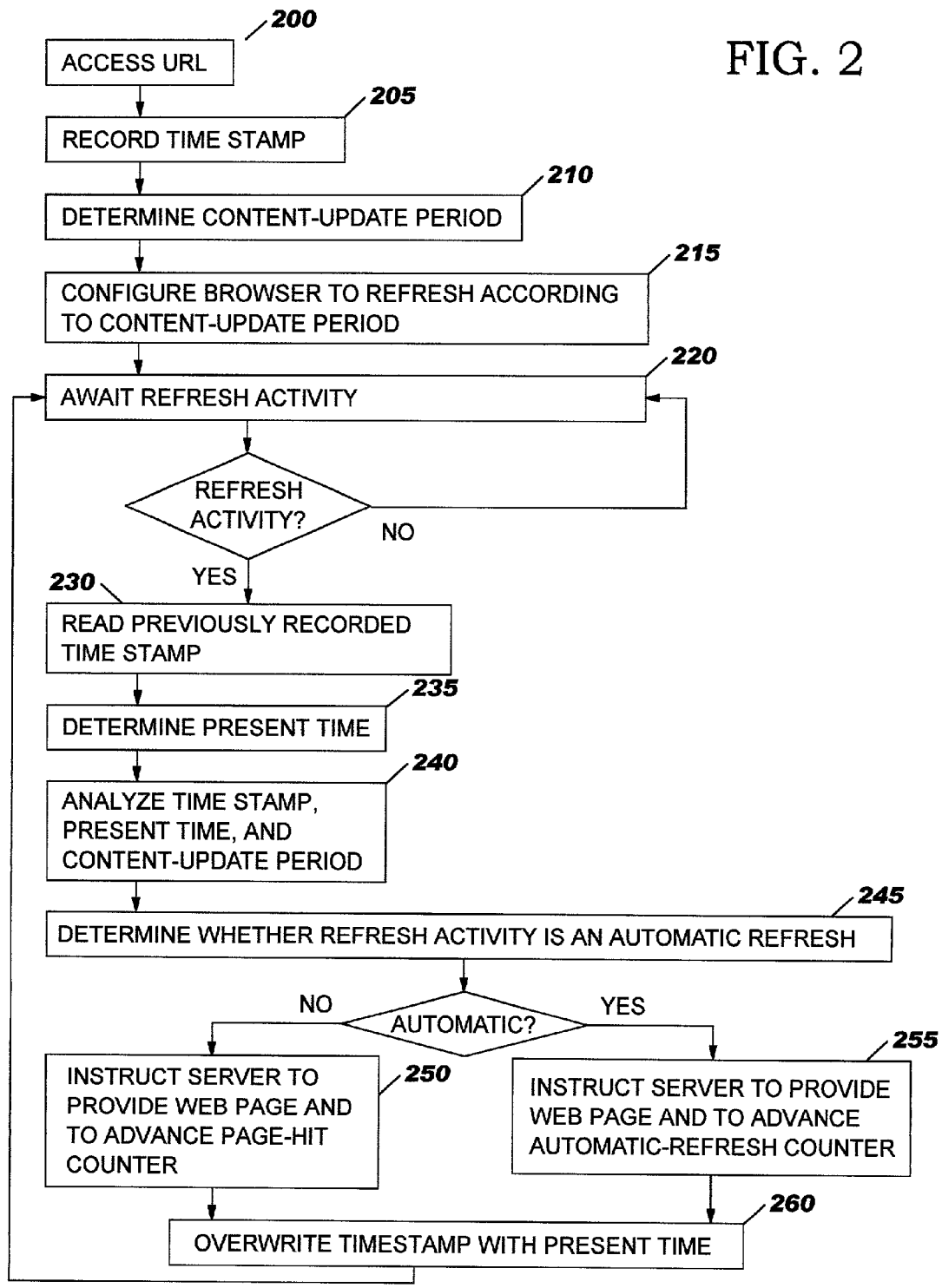
FIG. 2 shows an exemplary method by which the client provides information that enables the server to improve the accuracy of the count of page hits.

FIG. 2 shows an exemplary way in which the client 100 may determine whether a page access under its operation is a page hit or an automatic refresh. As shown in FIG. 2, the client 100 accesses the URL associated with the web page in question (step 200). The client 100 records the approximate time of the access (step 205) as a timestamp. In a preferred embodiment of the invention, the browser 110 calculates current epoch time using the getTime( ) JavaScript function in the JavaScript Date class. The timestamp may be recorded as part of a CGI query string associated with the page access, or within a cookie, or within a frameset.

The browser 110 then determines the content-update period of the web page (step 210) and appropriately configures its automatic refresh (step 215), for example according to:

```
<META http-equiv="refresh" content="120">
or according to:
    <script language="JavaScript">
    move = setTimeout("location.href=location.pathname;", 1200000);
    </script>
```

The client 100 then awaits refresh activity (step 220). When refresh activity is detected, the client 100 reads the previously recorded timestamp (step 230), and determines the present time (step 235). The client then analyzes the timestamp, the present time, and the content-update period (step 240), and determines whether the refresh activity is indicative of an automatic refresh (step 245). Details regarding steps 240 and 245 of FIG. 2 are discussed below with reference to FIG. 3. If the refresh activity is indicative of an automatic refresh, the client 100 instructs the server 130 to provide the web page and to advance the automatic-refresh counter 134 (step 255), overwrites the timestamp with the present time (step 260), and returns to await further refresh activity (step 220). Otherwise (i.e., the refresh activity is not indicative of an automatic refresh, and is therefore presumed to be indicative of a page hit), the client 100 instructs the server 130 to provide the web page and to advance the page-hit counter 132 (step 250), overwrites the timestamp with the present time (step 260), and returns to await further refresh activity (step 220).

Figure 3:
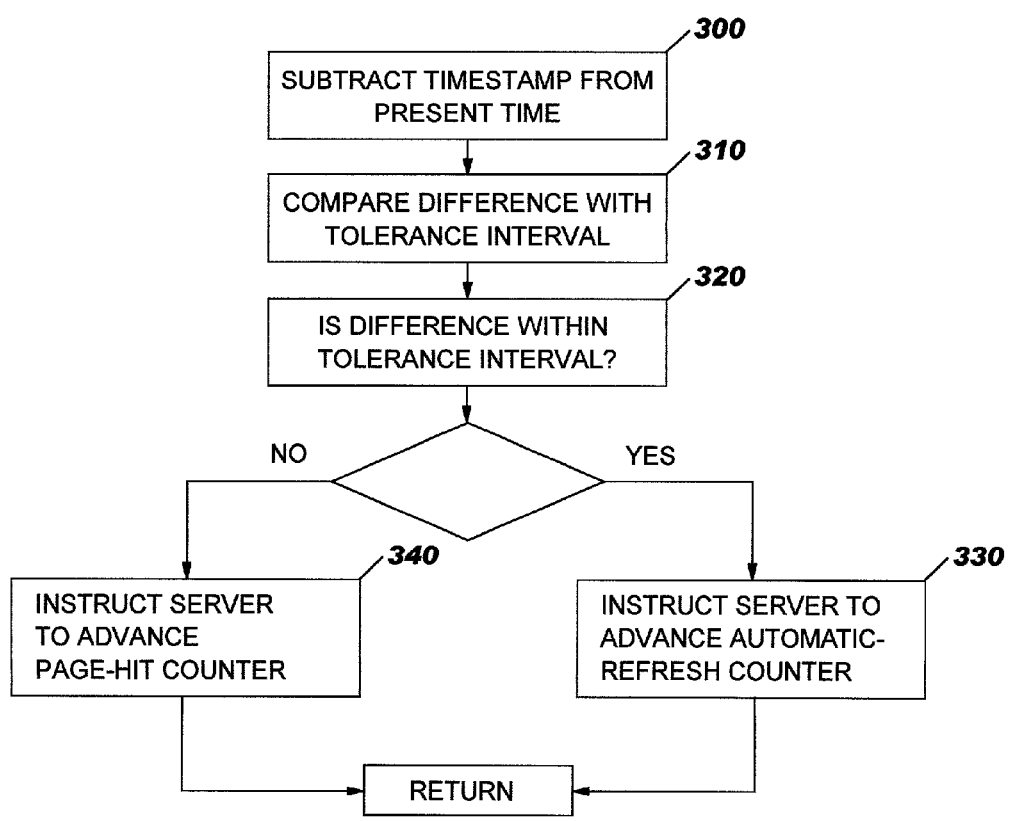
FIG. 3 shows an exemplary way of distinguishing between a page hit and an automatic refresh.

FIG. 3 shows an exemplary way of distinguishing between an automatic refresh and activity indicative of a page hit. The distinction is made by finding the time that has passed since the web page was last accessed by the browser 110, and comparing this time to a bound. The bound may be an endpoint of a tolerance interval that surrounds (includes) the content-update period, where the tolerance interval accounts for the various and unpredictable delays encountered in re-loading the web page. For example, if the content update period is 120 seconds, the tolerance interval might be between 118 and 145 seconds. Then, if the time between the last access of the web page and a current access is between 118 and 145 seconds, the current access is indicative of an automatic refresh; otherwise (i.e., the time between the last access of the web page and the current access of the web page is less than 118 seconds, or greater than 145 seconds), the current access of the web page is activity indicative of a page hit.

As shown in FIG. 3, the timestamp is subtracted from the present time to provide a difference (step 300). The difference is compared with the tolerance interval (step 310), and a determination is made whether the difference falls within the tolerance interval (step 320). If the tolerance falls within the tolerance interval, the client 100 instructs the server 130 to advance the automatic-refresh counter 134 (step 330); otherwise (i.e., the difference is not within the tolerance interval), the client 100 instructs the server 130 to advance the page-hit counter 132 (step 340).

The client 100 may instruct the server 130 regarding the page-hit counter 132 and the automatic-refresh counter 134 in a number of ways. These instructions may pass as part of a CGI query string, through a cookie, or as part of a framework. A preferred embodiment of the present invention passes information via a request for an uncachable GIF image with a specific query string, as described by co-pending U.S. patent application Ser. No. 09/641,495, to the present Assignee, filed 18 Aug. 2000, "Gathering Enriched Web Server Activity Data of Cached Web Content," the entirety of which is hereby incorporated herein by reference.

Figure 4:
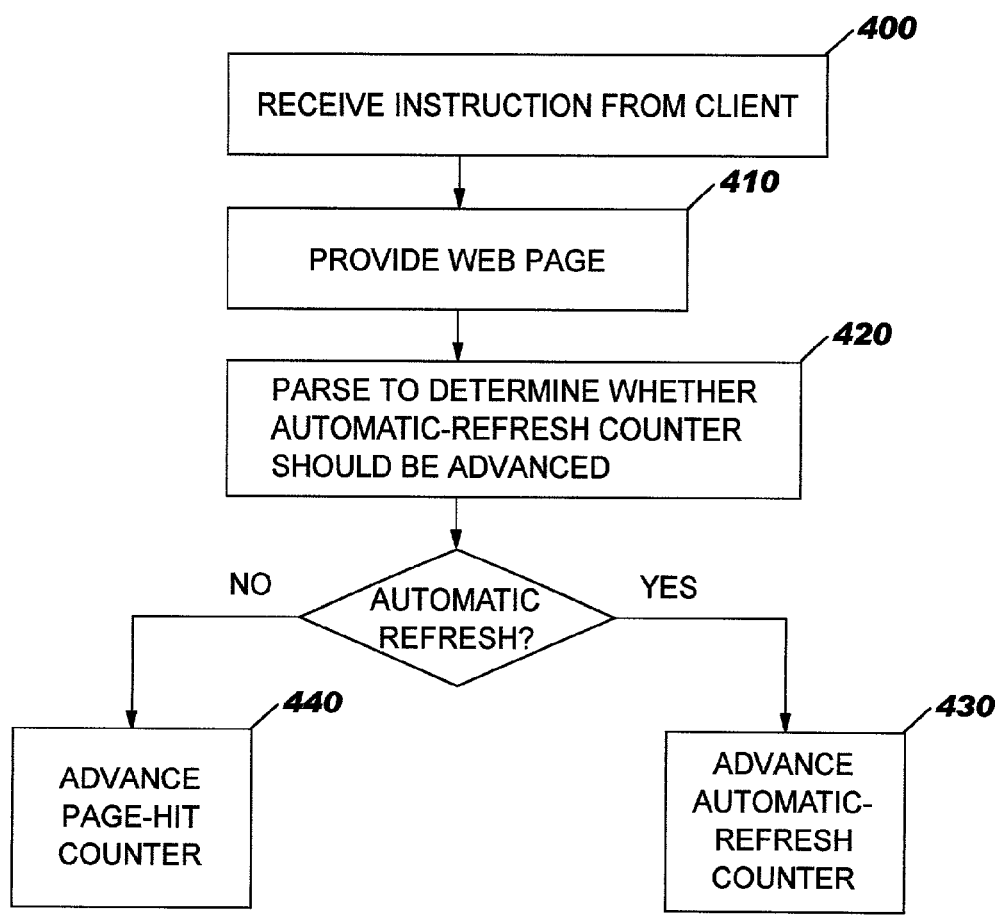
FIG. 4 shows aspects of the operation of a server that is improved according to the present invention.

FIG. 4 shows exemplary actions taken by the server 130 in response to receiving an instruction from the client 100. The server 130 receives the instruction from the client 100 (step 400), and provides the requested web page (step 410). The server 130 then further parses the instruction to determine whether the automatic-refresh counter 134 should be advanced (step 420). If the instruction indicates that the automatic-refresh counter 134 should be advanced, the server 130 advances the automatic-refresh counter 134 (step 430). Otherwise (i.e., the instruction indicates that the page-hit counter 132 should be advanced, or the instruction does not indicate that a counter should be advanced), the server advances the page-hit counter 132 (step 440).

From the preceding description, those skilled in the art will now appreciate that the present invention provides a more accurate way of counting how many time Internet users view a web page. The foregoing description is illustrative rather than limiting, however, and the invention is limited only by the claims that follow.

We claim:

1. A method for providing information that enables a server to record data indicative of the number of times a web page is accessed under deliberate control of a user, said method comprising:
   accessing the web page by a client, using a web browser, from the server that has transmitted the web page across a communication network to the client, wherein the server comprises two counters whose content is indicative of the number of times the web page has been accessed while not being automatically refreshed;
   recording a timestamp indicating an approximate time of accessing the web page by the client;
   determining a content-update period at which the web page is periodically updated by the server;
   configuring the browser to refresh the web page automatically according to the content-update period;
   after said accessing, re-accessing the web page;
   determining an approximate time of re-accessing the web page;
   analyzing the timestamp, the approximate time re-accessing the web page, and the content-update period;
   ascertaining, responsive to an outcome of said analyzing, whether said re-accessing the web page is or is not indicative of an automatic refresh by the web browser; and
   instructing the server to advance at least one counter of the two counters in a manner that reflects an outcome of said ascertaining, wherein after advancing the at least one counter in said manner the server is adapted to determine from the content of the two counters the number of times the web page has been accessed while not being automatically refreshed,
   wherein said recording the timestamp, said determining the content-update period, said configuring the browser, said re-accessing the web page, said determining the approximate time of re-accessing the web page, said analyzing, said ascertaining, and said instructing are performed by the client.

2. The method of claim 1, wherein said ascertaining has ascertained that the re-accessing the web page is indicative of said automatic refresh by the web browser.

3. The method of claim 1, wherein said ascertaining has ascertained that the re-accessing the web page is not indicative of said automatic refresh by the web browser.

4. The method of claim 1, wherein the two counters consist of a hit-rate counter and an automatic-refresh counter, wherein the hit-rate counter records the number of times the web page has been accessed while not being automatically refreshed, and wherein the automatic-refresh counter records the number of times the web page has been accessed while being automatically refreshed.

5. The method of claim 4, wherein said ascertaining has ascertained that the re-accessing the web page is not indicative of said automatic refresh by the web browser, and wherein during said instructing the at least one counter consists of the hit-rate counter.

6. The method of claim 4, wherein said ascertaining has ascertained that the re-accessing the web page is indicative of said automatic refresh by the web browser, and wherein during said instructing the at least one counter consists of the automatic-refresh counter.

7. The method of claim 1, wherein the two counters consist of a total access counter and an automatic-refresh counter, wherein the total access counter records the total number of times the web page has been accessed, and wherein the automatic-refresh counter records the number of times the web page has been accessed while being automatically refreshed.

8. The method of claim 7, wherein said ascertaining has ascertained that the re-accessing the web page is not indicative of said automatic refresh by the web browser, and wherein during said instructing the at least one counter consists of the total access counter.

9. The method of claim 7, wherein said ascertaining has ascertained that the re-accessing the web page is indicative of said automatic refresh by the web browser, and wherein during said instructing the at least one counter consists of the total access counter and the automatic-refresh counter.

10. The method of claim 1, wherein the two counters consist of a total access counter and a hit-rate counter, wherein the total access counter records the total number of times the web page has been accessed, and wherein the hit-rate counter records the number of times the web page has been accessed while not being automatically refreshed.

11. The method of claim 10, wherein said ascertaining has ascertained that the re-accessing the web page is not indicative of said automatic refresh by the web browser, and wherein during said instructing the at least one counter consists of the total access counter and the hit rate counter.

12. The method of claim 10, wherein said ascertaining has ascertained that the re-accessing the web page is indicative of said automatic refresh by the web browser, and wherein during said instructing the at least one counter consists of the total access counter.

13. The method of claim 1, wherein said analyzing comprises:
   computing a difference between the approximate time of re-accessing the web page and the timestamp;
   deciding whether the difference is within a specified tolerance interval, wherein the specified tolerance interval comprises the content-update period;
   if said deciding has decided that the difference is within the specified tolerance interval, then said ascertaining ascertains that the re-accessing the web page is indicative of said automatic refresh by the web browser; and
   if said deciding has decided that the difference is not within the specified tolerance interval, then said ascertaining ascertains that the re-accessing the web page is not indicative of said automatic refresh by the web browser.

14. The method of claim 13, wherein the specified tolerance interval is defined by a lower bound time and an upper bound time, and wherein the content-update period is greater than the lower bound time and less than the upper bound time.

15. The method of claim 1, wherein said instructing comprises communicating an instruction, as part of a CGI query string, to the server to advance the at least one counter.

16. The method of claim 1, wherein said instructing comprises communicating an instruction, as part of a cookie, to the server to advance the at least one counter.

17. The method of claim 1, wherein said instructing comprises communicating an instruction, as part of a framework, to the server to advance the at least one counter.

18. The method of claim 1, wherein said instructing comprises communicating an instruction, via a request for an uncachable GIF image with a specific query string, to the server to advance the at least one counter.

19. The method of claim 1, wherein the communication network comprises the Internet.

20. The method of claim 1, wherein the communication network comprises an Intranet.

* * * * *